(No Model.) 2 Sheets—Sheet 1.
E. O. ABBOTT.
CHECK PROTECTOR.
No. 448,705. Patented Mar. 24, 1891.
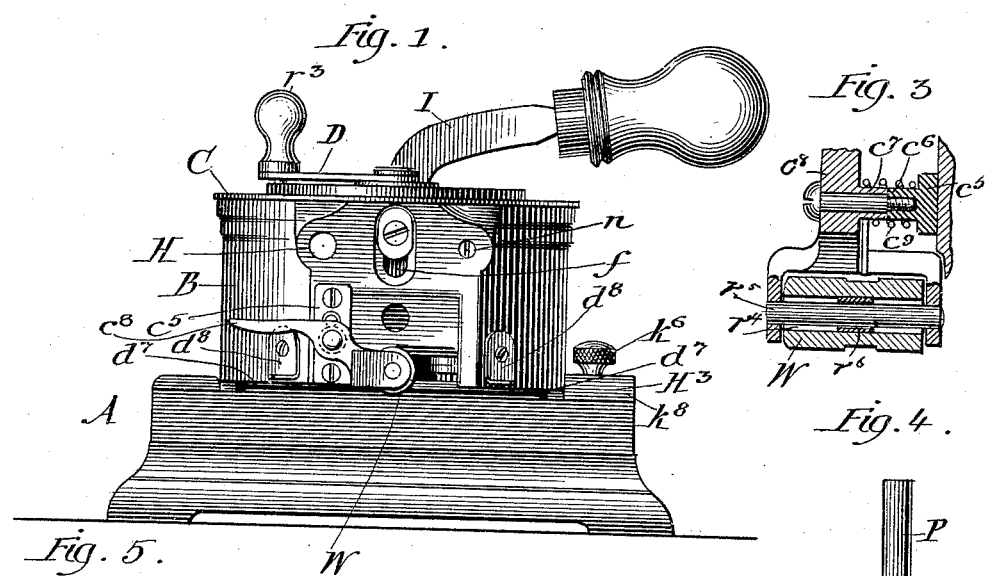
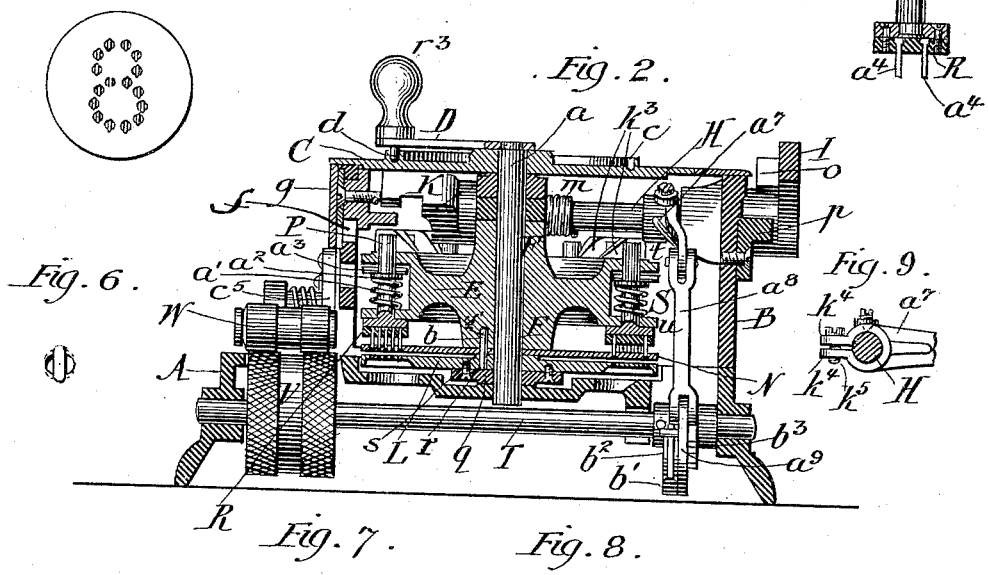
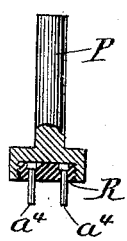
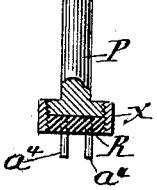
Witnesses:
Frank J. Blanchard
F. H. Kilbourn
Inventor:
Edwin O. Abbott
By H. Harrison
Attorney

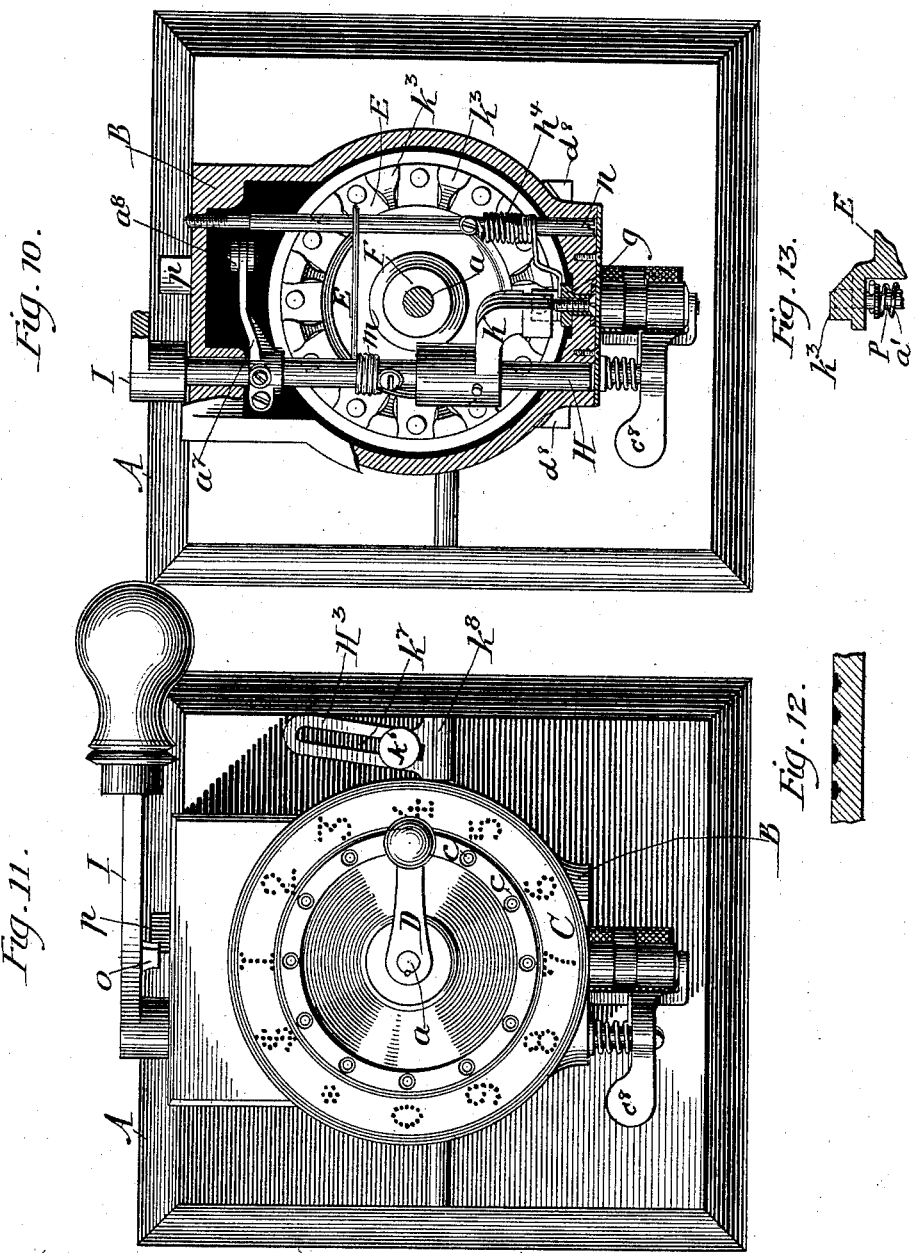

UNITED STATES PATENT OFFICE.

EDWIN O. ABBOTT, OF CHICAGO, ILLINOIS, ASSIGNOR TO THE ABBOTT MACHINE COMPANY, OF SAME PLACE.

CHECK-PROTECTOR.

SPECIFICATION forming part of Letters Patent No. 448,705, dated March 24, 1891.

Application filed February 16, 1889. Serial No. 300,186. (No model.)

*To all whom it may concern:*

Be it known that I, EDWIN O. ABBOTT, a citizen of the United States, residing at Chicago, in the county of Cook and State of Illinois, have invented certain new and useful Improvements in Check-Protectors, of which the following is a specification, to wit:

My invention relates to improvements in perforating-stamps; and it consists in certain improvements in the construction and arrangement of various parts, all of which will be hereinafter more particularly pointed out and described.

To enable others skilled in the art to which my invention pertains to make and use the same, I will now proceed to describe my improvements, referring to the accompanying drawings, in which—

Figure 1 is a front view of the check-protector containing my improvements. Fig. 2 is a vertical section of Fig. 1. Fig. 3 is a detail view of the new improved upper feed-roll. Fig. 4 is a detail view showing the construction of the punches and punch-shank. Fig. 5 is a plan view of the block holding the punches, showing the shape of the punch-heads. Fig. 6 is a perspective view of one hole of the punch-block with the punch inserted therein. Figs. 7 and 8 are modifications of Fig. 4. Fig. 9 is a detail view showing the feed-arm connected to the shaft and its construction. Fig. 10, Sheet 2, is a plan view of my check-protector with the dial-plate removed. Fig. 11 is a plan view of my check-protector with the dial-plate in position. Fig. 12 is a detail section of a part of the dial-plate, showing perforated holes. Fig. 13 is a partial sectional view of the cylinder, showing lugs or projections placed alternately with the punch-shanks and projecting slightly above them.

Similar letters refer to similar parts throughout the several views.

My present improvements are illustrated in connection with a check-protector similar to that shown and fully described in my patent, No. 401,871, dated April 23, 1889, and reference is made to said patent for a description of such parts as it is thought unnecessary to describe in detail in this specification.

A is the base or table, made of any suitable material, preferably of cast-iron. Upon this base is mounted a shell or casing B, containing most of the working parts of my machine, made in any suitable form, but preferably of the shape shown in the drawings. It is removably secured to the base by screws running into the body of the shell through the bottom of the base or otherwise.

C is a dial-plate removably attached to the top of the shell and having in its face figures 1, 2, 3, 4, 5, 6, 7, 8, 9, and 0, and dollar-sign and asterisk or any other suitable signs or figures. I preferably form the inside surface of the dial-plate with a flange to hold it concentric with the shell, so that it will be held firm.

Running through the center of the plate C is a vertical revolving shaft $a$, journaled in the plate and the base A below. On the top end of this shaft is a crank or lever D to revolve the shaft, this lever having a hollow knob in which is screwed a pin $d$, which fits or drops into the holes $c\ c$ in the dial-plate or flange ring or band on top of the dial-plate for the purpose of centering the punches and latching them temporarily.

The shell B has at one point a groove $f$. In this groove fits a tenon-shaped knee-block or plunger $g$, which is held in position in the shell by a screw passing through the washer, as shown, which allows it to be adjusted up and down and allowing it to contact with and between both the dog K and the punch-shank P P. Across the inside of the shell B, near its top, runs a horizontal shaft H, journaled in both sides of the shell. On the end of the shaft, on the outside of the shell, is a crank-handle I for oscillating the shaft. On the inside, rigidly secured to the shaft H, is a dog K, being made in such form that when the shaft is oscillated the dog will press down on the block or plunger $g$, so as to force down the punches under the block in a straight line and thereby avoid the tearing of the check or paper while being punched or perforated. The shaft H has on it a spring $m$, secured at one end to the shaft and coiled around it and the other end resting upon and hooked over a rod $n$, which runs through the shell near its top. This spring returns the oscillating shaft to its normal position and carries up the dog and allows the block or plunger $g$ to be forced up and out of the way of the punch-head and the projection on the top of the surface of the cylinder E, the spring having the further duty of feeding the paper or check. The upward momentum given to the shaft by the spring $m$ and the spring in the punch is stopped by the dog striking against the under side of the dial-plate and relieves the strain from the retaining-pawl of the feed mechanism, which would otherwise occur, and thereby enables me to use a weak retaining-pawl, which causes less friction and noise and gives better freedom for the parts to work.

In order to prevent the shaft from moving too far in its downward movement and through the dog and its connections from forcing the punches too far down against the stripper-plate, and thereby injuring the parts, I provide on the crank-handle a lug or projection $o$ of appropriate length, which strikes against a bracket or projection $p$ on the shell, which will limit the downward movement of the shaft or dog. This also prevents the pawl of the feed mechanism from engaging more than one tooth at a time in the ratchet, as presently explained.

Below the punch-cylinder and stripper-plate is a die-plate L, which encircles the bottom of the shaft and is firm to revolve with the shaft, being held by means of the collar or plate $q$, which is rigidly secured to the shaft, a screw passing through the collar into the die-plate.

Through the die-plate are perforations, which are duplicate figures and signs as on the dial-plate, but in opposition, one being from right to left, the other from left to right, these figures and signs in the die-plate being perforations or otherwise. Through this die-plate are small holes $r$ near the shaft, directly under similar holes $s$ in the stripper-plate, through which holes in both plates passes a dowel-pin $s'$, which is secured to the bottom face of the lower hub of the punch-cylinder. The stripper-plate N is directly over the die-plate, with a space between sufficient to admit the insertion of the check or paper to be perforated and to be withdrawn. This plate encircles the shaft and is firm to revolve with it. It has through it the same signs and figures as in the die-plate and directly over the same. These holes act as a guide for the punches. They also act as means to allow the punches to pass up without carrying the paper with it.

E is a double-flanged wheel or cylinder, having hubs F F at top and bottom and a solid body having a groove S in its periphery, which forms top and lower flanges $t$ and $u$, which have holes in them, through which pass punch-shanks P P, in number corresponding to the signs and figures in the die-plate. The punch-cylinder's main body and flanges are made, preferably, in one solid piece because of cheapness and convenience of construction and durability.

P P are punch rods or shanks which pass through holes in the flanges of the punch-wheel or cylinder corresponding in number with the figures and signs. The tops of the rods in their normal position extend sufficiently above the flanges to be in proximity to the knee-block $g$, operated by the dog K, so as to be readily pressed down when the shaft is oscillated. I prefer in most cases to make the punch-shanks in the manner as shown in Fig. 8 of the drawings, which is as follows: I thread the head of the punch-shank P and screw on a sleeve $x$, into which sleeve I screw the punch-head. In Fig. 7 I have a modification of the same. Between the flanges of the punch-cylinder and surrounding each rod is a spiral spring $a'$, which rests against the top surface of the lower flange. The spring at its top bears against a small washer $a^2$, which is preferably loose on the rod, slightly below the under surface of the top flange, and held down by a pin $a^3$ passing through the punch-shank, extending out a short distance beyond the periphery of the washer. The object of this spring is to draw the punches out of the paper and the punches and punch-shank to their normal position when the pressure is released.

R is what I call a "punch block or disk," made preferably of brass or any suitable material, in which are holes corresponding with the figures or signs below, through which are inserted the punches $a^4$ $a^4$, which perforate the paper. This block is secured to the punch-shank by the threaded sleeve $x$, so that the punches can be removed for repairs.

Instead of upsetting the heads of the punches to fit countersunk holes, as shown in my prior patent, I prefer to flatten the ends, as shown in Figs. 5, 6, and 7, so that they are broader than the punch in one direction and narrower in another at right angles thereto. By making the punch-heads of this shape and the upper ends of the holes in the plate R to correspond I am enabled to secure the punches tightly in place and prevent them from turning in their sockets, and also obviate the wedge action of conical heads, which tends to warp the plate R and throw the punches out of line.

$a^7$ is an arm removably attached to the shaft H near one end, the outer end of the same being hinged to a connecting-rod $a^8$, which passes downward and is connected to an irregular-shaped plate $a^9$, journaled upon the feed-shaft T, which runs through and is journaled in the base. The plate $a^9$ has attached to one side of it a small pawl $b'$, which engages the ratchet-wheel $b^2$, which is on the feed-shaft T on one side of plate $a^9$. On the other side of plate $a^9$ is another ratchet-wheel $b^3$, also on the shaft, both of said ratchet-wheels being rigidly but removably attached to said shaft, the plate $a^9$ being held in position laterally by the ratchet-wheels.

In connection with the plate $a^9$ and the ratchets I provide a mechanism which is not shown in the drawings, but fully set forth in my said patent, No. 401,871, for the purpose of securely holding the check while the perforating is being done and prevent overspacing.

Near the front end of the feed-shaft T, on the inside of the base and projecting through the base and slightly above its upper surface, is removably secured a feed-roller V, which revolves with the shaft which feeds the paper or check to be punched or perforated. Removably secured to the outside of the shell by means of a bracket $c^5$ or otherwise is a pressure-roll W, directly over the feed-roll V, journaled on a pin or rod in the bracket, so that when the feed-roll V revolves this will revolve also. This holds the paper down on the feed-roll V and makes the feeding uniform and in a straight line.

The bracket $c^5$ is provided with a projection $c^6$, against which is screwed a hub $c^7$ of the thumb-lever $c^8$, the other end of which is formed to receive a journal for the upper feed-roll W. The object of this construction is to permit the raising of the roller W by pressing on the thumb-lever to insert the paper or check.

By practical experience since my former invention I have found that it is preferable to perforate checks in the right-hand end, and in doing this in my former construction the check would cover up the thumb-piece on the lower roll. By the present construction I provide a spring $c^9$, coiled around the hubs $c^6$ and $c^7$, one end fastened to the bracket $c^5$ and the other end bearing on the lever $c^8$ to press the roller W down on the feed-roll V to feed the paper, or on the paper which is between the said feed-rolls. The contact thus obtained by the pressure will cause the roller W to revolve in opposite directions, but in unison with the lower feed-roller V, thereby feeding the paper. If the paper is not between the rollers, there is a peripheral contact of the two rollers, whereby the revolving of the lower roll V will revolve the upper roller W. The same pressure and revolution will be obtained when the paper is between the rollers and the paper will be fed. It will be noticed that the front portion of the shell at its lower edge is slightly above the base, leaving an opening or slit $d^7$ to permit the paper or check to be inserted between the stripper and the die-plates for perforating.

On both sides of the shell and on a line with the end of the figure or sign to be operated in perforating and at right angles with the feed-shaft T are placed two fingers or plates $d^8$, of any design or material, for the purpose of designating the line upon which the figures or signs are to be perforated. On the rod $n$ is a spring $h^4$, securely fastened to it at one end and coiled thereon, the other end of the spring resting in or against the screw in the block $g$ to raise block $g$ to its normal position when the pressure is released. The tension of the spring is regulated by means of the rod $n$, which has one end screw-threaded and the other a slotted head for turning and set-screw to hold it in position when the proper adjustment is obtained.

On the top surface of the punch-cylinder E, near its periphery, are lugs or projections $k^3$, placed alternately with the punches, in number corresponding with the number of the punches. The upper surfaces of the lugs $k^3$ project a little above the top of the punch-shanks P, the object of these lugs being to prevent the knee-block $g$ from being pressed down on the punch-shank P, thus locking the block $g$ in its elevated position, except when the punches are in position to perforate the paper and the indicating-pin $d$ is in the proper hole in the dial-plate.

In Fig. 9 of the drawings is shown the manner of fastening the feed-arm $a^7$ to the shaft H, which is done in the following manner: One side of the hub of the arm $a^7$ is formed with bifurcations $k^4$ $k^4$, through which passes a screw $k^5$ for the purpose of clamping it to the shaft, as will be readily seen from the drawings. This construction facilitates the adjustment in the assembling of the machine.

$H^3$ is a guide bracket or plate which rests on the top of the base and is secured to it by a thumb-screw $k^6$ passing through a slot $k^7$ in the flat portion of the plate, which rests and slides on the base, one end of the bracket being formed with an arch $k^8$ to stiffen it and allow the check or paper to rest against, all of which will be clearly seen from Figs. 1 and 11 of the drawings.

I find from experience since my former application that when the letters or figures or signs are stamped in the dial-plate the stamp carries down the metal with it, thus making the walls of the stamped figure very irregular and not well defined, so that when they were filled the letters would be very indistinct unless the plate was faced off considerably after the filling was done. To obviate this I now drill a series of holes forming the letters, figures, or signs, which makes them very distinct after being filled and polished. I therefore consider the perforated holes much neater and easier obtained and a great benefit over the other. I have shown these perforated holes in Figs. 11 and 12 of the drawings.

In Fig. 3 of the drawings the feed-roller W is shown with its journal-hole $r^4$ considerably larger than the journal-pin $r^5$, with a hardened short steel bushing $r^6$ inserted therein, having a cylindrical bore slightly larger than the journal-pin. This construction is for the purpose of relieving the ends of the roll from a bearing on the journal-pin, so that it may be free to rock with respect to its axis and to adjust itself to any irregularities in the paper or the lower feed-shaft; also, that its periphery may at all times press evenly on the periphery of the lower feed-roll, thus at all times feeding the check or paper in a straight line at right angles with the axis of the lower feed-roll.

$r^6$ is made to fit a little loosely on pin $r^5$ to accomplish the purpose just stated.

By making the roller W and its bushing $r^6$ separable I am enabled to harden the latter to a much greater degree than would be the case were the roller made in a single piece. Furthermore, I can use different materials—as, for instance, hardened steel for the bushing and wood or cast-iron for the roller proper, thereby securing greater economy.

The operation is as follows: The feed-rolls are separated by pressing upon the thumb-lever $c^8$, and the check or paper is then inserted between the rolls into the slit $d^7$, so as to bring the line on which the figures or signs are to be perforated directly in a line with the front edge of the indicating-brackets $d^8$. Then the pressure is released from the thumb-lever, and the check or paper will then be held firm between the rolls. I then take hold of the knob $r^3$, lifting it up, and turn the handle D to that figure or sign I wish to perforate, allowing the pin $d$ to drop into the hole $c$ opposite said figure or sign. Then by pressing down on the crank-handle I until the lug $o$ has struck the bracket $p$ the shaft H will be oscillated and through the dog K and intermediate block $g$ press down the punches and perforate the check or paper. Then by allowing the handle to rise, which is done by spring $m$, the parts will return to their normal position. While they are being returned, and after the punch has been withdrawn from the check or paper, the check or paper is fed by the feed mechanism, as described, ready for another perforation. The same operation is repeated as before, and so on until all the desired perforations are made. The check or paper is then released by pressing upon the thumb-lever $c^8$ and withdrawn.

The operation is almost the same as in the machine described in my said patent, No. 401,871, and many of the parts herein described are covered in said application, and I do not herein claim them; but What I do claim, and desire to secure by Letters Patent, is—

1. In a paper-feeding mechanism, the combination of a roller mounted in fixed bearings and devices for operating the same with a roller mounted upon a spring-pressed journal-pin and having a central bushing with a cylindrical bore of larger diameter than said journal-pin, substantially as described.

2. The roller W, having the central bushings $r^6$, shorter than the roller, and the journal-pin $r^5$, said bushing having a cylindrical bore of larger diameter than said journal-pin and constituting a separable bearing for the roller on said pin, substantially as described.

3. In a perforating-stamp, the punch $a^4$, having a flattened head which is wider in one direction and narrower in another than the body of the punch, substantially as described.

4. In a perforating-stamp, the punches $a^4$, having flattened heads which are wider in one direction than the body of the punch, in combination with the plate R, having perforations to receive and hold said punches, substantially as described.

5. In a perforating-stamp, the combination, with a punch-wheel having a series of punches mounted therein and a series of projections intermediate the punches, of a centering and latching device for the punches and a plunger independent of said device for depressing the punches, said projections being adapted to lock said plunger against depression except when a punch is properly centered, substantially as set forth.

6. In a perforating-stamp, a punch-wheel having a series of punches mounted therein and a series of projections arranged intermediate the punches, said punches projecting above the upper flange of the wheel and said projections extending upward slightly more than the punches, substantially as described.

In testimony whereof I affix my signature in presence of two witnesses.

EDWIN O. ABBOTT.

Witnesses:
H. HARRISON,
T. H. KILBOURN.